(12) United States Patent
Saito

(10) Patent No.: US 12,151,412 B2
(45) Date of Patent: Nov. 26, 2024

(54) MESH FOR INSERT MOLDING

(71) Applicant: NIFCO INC., Yokosuka (JP)

(72) Inventor: Norio Saito, Yokosuka (JP)

(73) Assignee: NIFCO INC., Yokosuka (JP)

( * ) Notice: Subject to any disclaimer, the term of this patent is extended or adjusted under 35 U.S.C. 154(b) by 164 days.

(21) Appl. No.: 17/799,742

(22) PCT Filed: Feb. 10, 2021

(86) PCT No.: PCT/JP2021/005017
§ 371 (c)(1),
(2) Date: Aug. 15, 2022

(87) PCT Pub. No.: WO2021/172021
PCT Pub. Date: Sep. 2, 2021

(65) Prior Publication Data
US 2023/0075791 A1 Mar. 9, 2023

(30) Foreign Application Priority Data

Feb. 25, 2020 (JP) .................................. 2020-029338

(51) Int. Cl.
B65D 3/00 (2006.01)
B01D 39/12 (2006.01)
B29C 45/14 (2006.01)
B65D 3/04 (2006.01)

(52) U.S. Cl.
CPC ........ B29C 45/14336 (2013.01); B01D 39/12 (2013.01); B65D 3/04 (2013.01)

(58) Field of Classification Search
CPC .................................................. B29C 45/1418
See application file for complete search history.

(56) References Cited

U.S. PATENT DOCUMENTS

| 3,931,385 A | * | 1/1976 | Sutch | B29C 45/14475 264/154 |
| 4,108,587 A | * | 8/1978 | Rumball | B31B 50/44 425/129.1 |
| 5,368,798 A | * | 11/1994 | Mizukoshi | B29C 45/14 264/154 |

FOREIGN PATENT DOCUMENTS

| JP | 2001-179770 A | | 7/2001 |
| JP | 2001179770 | * | 7/2001 |
| JP | 2005-177639 A | | 7/2005 |
| JP | 2011-148312 A | | 8/2011 |

OTHER PUBLICATIONS

International Search Report and Written Opinion issued in connection with corresponding PCT Patent Application No. PCT/JP2021/005017 dated Mar. 30, 2021.

* cited by examiner

*Primary Examiner* — Edmund H Lee
(74) *Attorney, Agent, or Firm* — Tarolli, Sundheim, Covell & Tummino LLP

(57) ABSTRACT

A mesh for insert molding is formed from a single mesh sheet. The mesh for insert molding includes a side wall part that has a band shape extending along the longitudinal direction and includes two joining margins at the longitudinal end parts thereof, a bottom part positioned in the width direction of the side wall part, and a connecting part for connecting the bottom part to the side wall part. The mesh for insert molding is configured so as to be arranged in a die in a state of being molded into a cylindrical shape.

8 Claims, 3 Drawing Sheets

MESH FOR INSERT MOLDING

RELATED APPLICATIONS

The present invention is a U.S. National Stage under 35 USC 371 patent application, claiming priority to Serial No. PCT/JP2021/005017, filed on Feb. 10, 2021, which claims priority from Japanese Patent Application No. 2020-029338 filed on Feb. 25, 2020; the entireties of both are hereby incorporated herein by reference.

TECHNICAL FIELD

The present disclosure relates to an insert-molded mesh.

BACKGROUND ART

Insert molding is performed to manufacture a filter for fluid. In one example of insert molding, a mold includes a lower mold that has a cylindrical projection and an upper mold that has a recess into which the projection is fitted. The upper mold includes a groove extending radially from the surface defining the recess. When performing insert molding with such a mold, a cross-shaped mesh is prepared. The central portion of the mesh is arranged on the top surface of the projection, and the projection on which the mesh is arranged is fitted into the recess of the upper mold. This results in the plane from where the recess extends bending the mesh at the boundary between the central portion of the mesh and the extended portion of the mesh extending away from the central portion. Thus, the mesh is arranged in the upper mold in a state extending along the outer surface of the projection. Then, synthetic resin is injected into the groove of the upper mold, and the synthetic resin is hardened to form a filter (refer to, for example, Patent Document 1).

CITATION LIST

Patent Literature

Patent Literature 1: Japanese Laid-Open Patent Publication No. 2001-179770

SUMMARY OF INVENTION

Technical Problem

As described above, when the projection of the lower mold is fitted into the recess of the upper mold, the mesh is bent along the outer surface of the projection. In order to improve the accuracy of where the mesh is positioned relative to the surface of the recess, the central portion of the mesh needs to be accurately arranged on the top surface of the projection. Further, in order to improve the accuracy of where the mesh is positioned relative to the groove of the upper mold, the mesh needs to be accurately positioned in the circumferential direction of the projection. In this manner, it is difficult to accurately position the mesh relative to the mold. Thus, it is desirable that the mesh be arranged easily.

It is an objective of the present disclosure to provide an insert-molded mesh that allows for easy arrangement in a mold.

Solution to Problem

According to one aspect of the present disclosure, an insert-molded mesh is formed by a single mesh sheet. The insert-molded mesh includes a side wall that is band-shaped and extends in a longitudinal direction, the side wall including two bonding margins at two ends in the longitudinal direction; a bottom wall located in a width direction from the side wall; and a connection portion that connects the side wall and the bottom wall. The insert-molded mesh is configured to be shaped into a tubular form and arranged in a mold.

According to one aspect of the present disclosure, an insert-molded mesh is formed by a single mesh sheet. The insert-molded mesh includes a side wall having a tubular form that is bonded at a bonding margin; welded portions arranged on the bonding margin at intervals in a direction in which a tubular body formed by the side wall extends; a bottom wall that covers an area formed by one tube end of the side wall; and a connection portion that connects the side wall and the bottom wall.

DESCRIPTION OF EMBODIMENTS

First Embodiment

Figure 1:
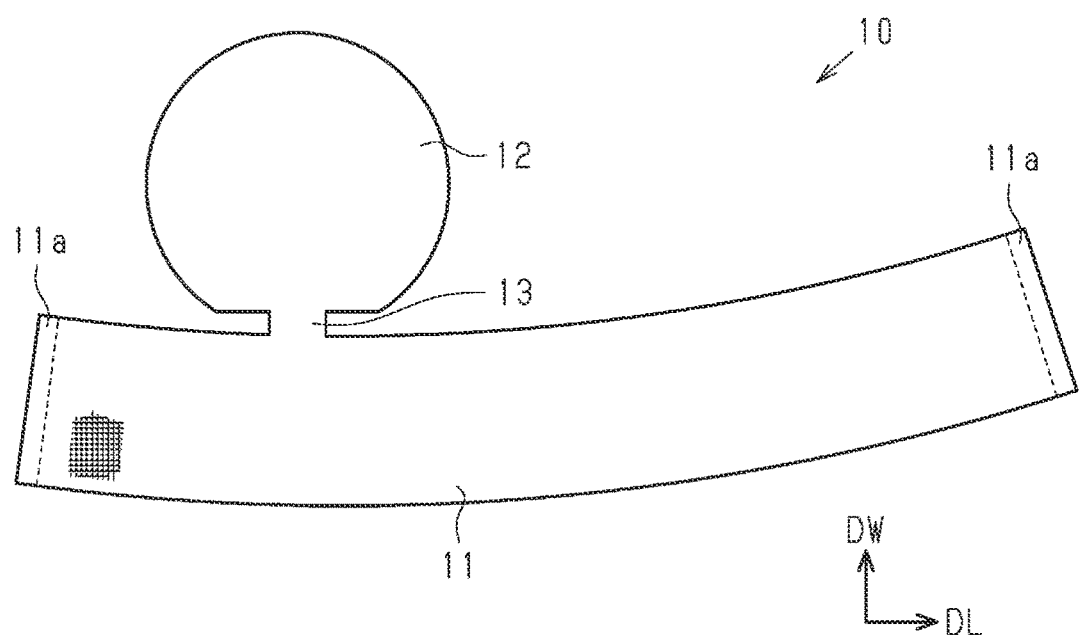
FIG. 1 is a plan view of an insert-molded mesh according to a first embodiment in an unfolded state.

An insert-molded mesh 10 according to a first embodiment will now be described with reference to FIGS. 1 to 4. FIG. 1 shows the insert-molded mesh 10 in an unfolded state.

As shown in FIG. 1, the insert-molded mesh 10 is formed by a single mesh sheet. The mesh sheet is a textile woven with fine metal wires. The insert-molded mesh 10 is shaped to be tubular and arranged in a mold that forms a filter including the insert-molded mesh 10.

The insert-molded mesh 10 includes a side wall 11, a bottom wall (end wall) 12, and a connection portion 13. The side wall 11 is band-shaped and extends in a longitudinal direction DL. The side wall 11 includes two bonding margins 11a at the two ends in the longitudinal direction DL. The bottom wall 12 is located in a width direction DW from the side wall 11. The width direction DW is orthogonal to the longitudinal direction DL. The connection portion 13 connects the bottom wall 12 and the side wall 11.

The bonding margins 11a of the side wall 11 are bonded together, and the connection portion 13 is bent so that the bottom wall 12 covers the area of the opening in the tubular side wall 11. This shapes the insert-molded mesh 10 into a tubular form having the bottom wall 12. In this state, the insert-molded mesh 10 is arranged in the mold. This improves the accuracy of where the insert-molded mesh 10 is positioned in the mold and facilitates the arrangement of the insert-molded mesh 10 in the mold.

The connection portion 13 is shaped to extend from the side wall 11 to the bottom wall 12 and is located between the side wall 11 and the bottom wall 12 in the width direction DW of the side wall 11. In the example shown in FIG. 1, the connection portion 13 is rectangular and extends in the width direction DW.

In the longitudinal direction DL, the width of the connection portion 13 is less than the width of the bottom wall 12. This forms gaps between the side wall 11 and the bottom wall 12 over a range corresponding to the difference between the width of the connection portion 13 and the width of the bottom wall 12 in the width direction DW of the side wall 11. This avoids the formation of creases at the boundary between the side wall 11 and the bottom wall 12 when the connection portion 13 is bent to shape the insert-molded mesh 10 to be tubular.

The connection portion 13 connects the bottom wall 12 and the side wall 11 at positions separated from the bonding margins 11a in the longitudinal direction DL. That is, the connection portion 13 is connected to the side wall 11 at a portion other than where the ends of the side wall 11 are located in the longitudinal direction DL. Thus, the two bonding margins 11a are easily bonded together. Specifically, when the two bonding margins 11a are bonded, the connection portion 13 is separated from the bonding margins 11a that are being bonded so that the connection portion 13 does not obstruct the bonding.

The bottom wall 12 is not adjacent to the bonding margins 11a of the side wall 11 in the width direction DW. The bottom wall 12 is arranged closer to one of the bonding margins 11a than the other one of the bonding margins 11a. Thus, when the two bonding margins 11a are bonded, the bottom wall 12 is separated from the bonding margins 11a when the bonding margins 11a are being bonded so that the bottom wall 12 does not obstruct the bonding.

The side wall 11 is arcuate and extends in the longitudinal direction DL. The side wall 11 has a curvature such that its center of curvature is located at the side of the side wall 11 closer to the bottom wall 12. This avoids the formation of creases in the side wall 11 and shapes the side wall 11 into a truncated conical form with the bottom wall 12 defining a top surface.

Figure 2:
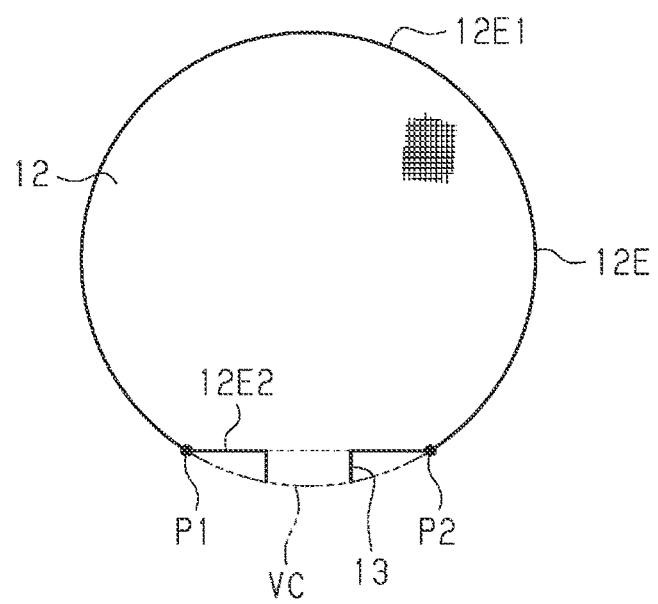
FIG. 2 is a partially enlarged plan view of the insert-molded mesh shown in FIG. 1.

As shown in FIG. 2 the bottom wall 12 is substantially circular. An imaginary circle VC can be drawn along an edge 12E of the bottom wall 12. The imaginary circle VC includes a first point P1 and a second point P2. The edge 12E of the bottom wall 12 includes a major arc portion 12E1 that connects the first point P1 and the second point P2 on the imaginary circle VC and a straight portion 12E2 that connects the first point P1 and the second point P2. The connection portion 13 is connected to the straight portion 12E2.

When the connection portion 13 is bent at the boundary between the side wall 11 and the connection portion 13, and the side wall 11 is shaped into a tubular form with a tube end that extends along the edge 12E of the bottom wall 12, gaps are formed by the tube end of the side wall 11, the straight portion 12E2, and the connection portion 13. This avoids the formation of creases after shaping the insert-molded mesh 10.

The connection portion 13 is connected to the straight portion 12E2 at a middle part in the longitudinal direction DL. This reduces differences in the size of the gaps formed at the two opposite sides of the connection portion 13 when the insert-molded mesh 10 is shaped. Thus, the difference in mechanical strength is reduced between the two opposite sides of the connection portion 13 during insert molding in which the gaps formed at the sides of the connection portion 13 are filled with resin.

Figure 3:
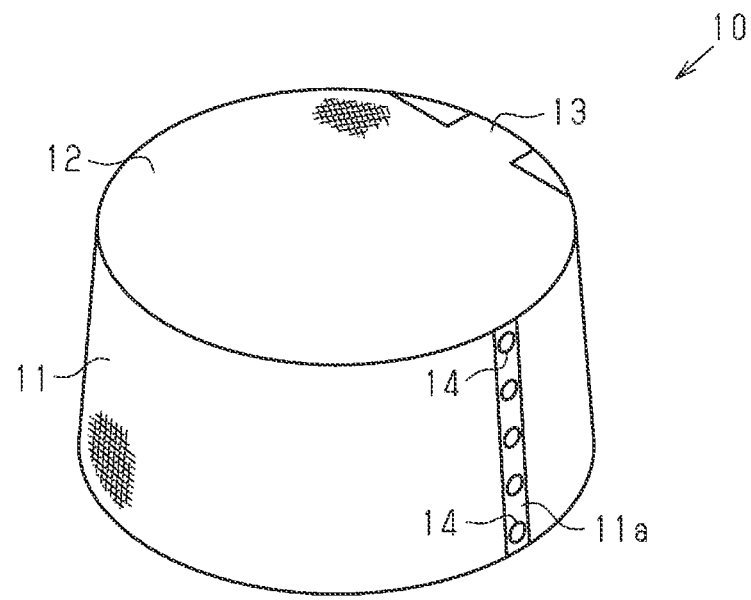
FIG. 3 is a perspective view of the insert-molded mesh shown in FIG. 1 in a state having a tubular shape.

FIG. 3 shows the insert-molded mesh 10 shaped into a tubular form.

As shown in FIG. 3, the insert-molded mesh 10 is shaped into a truncated conical form with the bottom wall 12 defining the top surface. The bonding margins 11a are bonded so that the side wall 11 is tubular. The bonding margins 11a include welded portions 14 arranged at intervals in the direction in which the tubular body, which is formed by the side wall 11, extends. The bottom wall 12 covers an area formed by one tube end of the side wall 11. The connection portion 13 connects the bottom wall 12 and the side wall 11. The two bonding margins 11a arranged at the two ends of the side wall 11 are securely bonded together by the welded portions 14, which are arranged in the direction in which the tubular body extends.

When the insert-molded filter is manufactured, the bonding margins 11a are bonded so that the side wall 11 is shaped into a tubular form, and the connection portion 13 is bent at the boundary with the side wall 11. In this state, the insert-molded mesh 10 is arranged in a recess of a mold. This allows the insert-molded mesh 10 to be arranged in the recess of the mold such that the insert-molded mesh 10 extends along the surface of the recess in the mold. This accurately positions the insert-molded mesh 10 in the mold.

Figure 4:
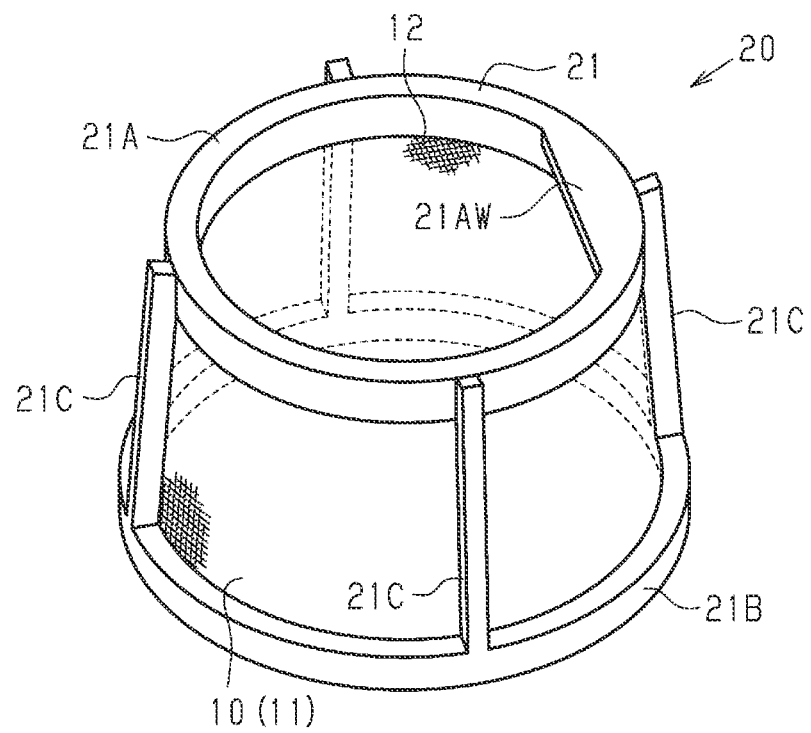
FIG. 4 is a perspective view illustrating the structure of an insert-molded filter manufactured with the insert-molded mesh of FIG. 1.

FIG. 4 shows an insert-molded filter 20 manufactured with the insert-molded mesh 10.

As shown in FIG. 4, the insert-molded filter 20 includes the insert-molded mesh 10 and a plastic body 21. The body 21 includes a first ring 21A, a second ring 21B, and posts 21C. The posts 21C are arranged between the first ring 21A and the second ring 21B and connected to the first ring 21A and the second ring 21B. In the example shown in FIG. 4, the body 21 includes four posts 21C arranged at regular intervals in the circumferential direction of the first ring 21A.

In the insert-molded filter 20, the insert-molded mesh 10 is integrally molded with the body 21 so that the insert-molded mesh 10 covers the opening in the first ring 21A and the openings formed by the posts 21C between the first ring 21A and the second ring 21B. Specifically, the bottom wall 12 of the insert-molded mesh 10 covers the opening in the first ring 21A, and the side wall 11 of the insert-molded mesh 10 covers the openings between the posts 21C.

The first ring 21A includes a wide portion 21AW that is wider than other parts of the first ring 21A. In the insert-molded filter 20, the wide portion 21AW covers the gap formed by the tube end of the side wall 11, the bottom wall 12, and the connection portion 13.

As described above, the insert-molded mesh according to the first embodiment has the following advantages.
  (1) The insert-molded mesh 10, which is shaped to have a tubular form and includes the bottom wall 12, is arranged in the mold. This allows the insert-molded mesh 10 to be accurately positioned in the mold.
  (2) Creases are not formed at the boundary between the side wall 11 and the bottom wall 12 when bending the connection portion 13.
  (3) The gaps formed by the tube end of the side wall 11, the straight portion 12E2, and the connection portion 13 avoid the formation of creases when shaping the insert-molded mesh 10.
  (4) The two bonding margins 11a are easily bonded together.
  (5) The two bonding margins 11a arranged at the two ends of the side wall 11 are securely bonded together by the welded portions 14.

Second Embodiment

An insert-molded mesh 30 according to a second embodiment will now be described with reference to FIGS. 5 to 6. The insert-molded mesh 30 according to the second embodiment differs in the structure around the connection portion from the insert-molded mesh 10 of the first embodiment. The difference will be described in detail. Same reference numerals are given to the components of the insert-molded mesh according to the second embodiment that are the same as the corresponding components of the insert-molded mesh according to the first embodiment. Such components will not be described in detail.

Figure 5:
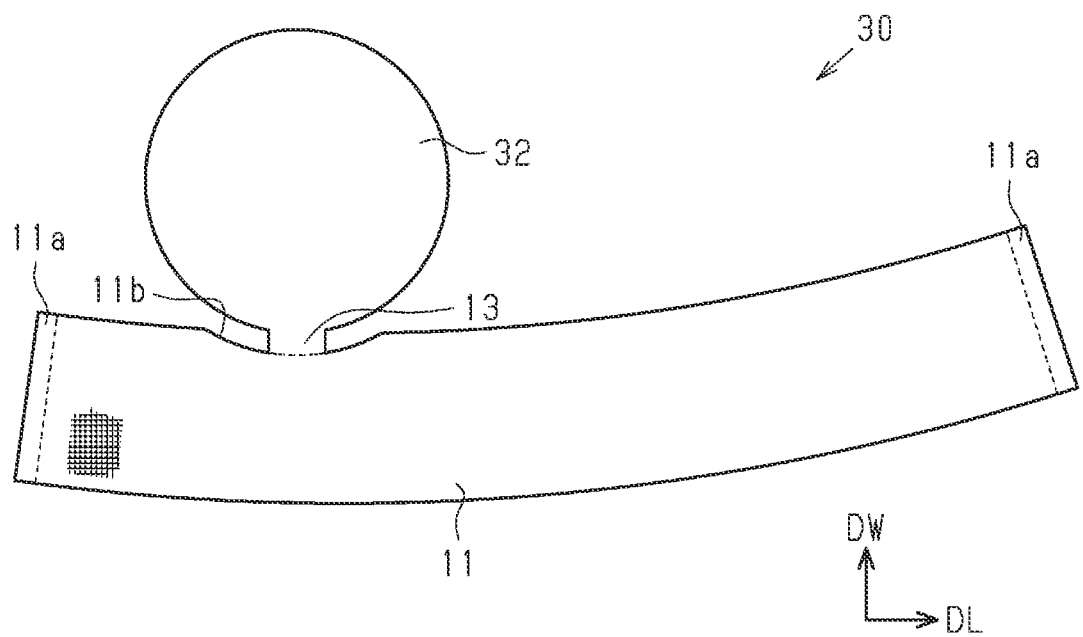
FIG. 5 is a plan view of an insert-molded mesh according to a second embodiment in an unfolded state.

FIG. 5 shows the insert-molded mesh 30 in an unfolded state.

As shown in FIG. 5, the side wall 11 of the insert-molded mesh 30 includes an indentation 11b. The indentation 11b of the side wall 11 is arranged on one of the sides that extend in the longitudinal direction DL. In the present embodiment, the indentation 11b is arcuate and has a curvature of which the center of curvature is located outside the side wall 11. The indentation 11b does not need to be arcuate and may be, for example, rectangular.

The connection portion 13 is arranged between the side wall 11 and a bottom wall 32 in the width direction DW of the side wall 11. The connection portion 13 connects the bottom wall 32 and the indentation 11b of the side wall 11. The connection portion 13 is connected to a portion of the indentation 11b that is most indented from the side including the indentation 11b toward the other side, which extends in the longitudinal direction DL. The connection portion 13 may be connected to a portion of the indentation 11b other than the most indented portion.

The bottom wall 32 is circular. The circumference of the bottom wall 32 is partially connected to the indentation 11b of the side wall 11 by the connection portion 13.

Figure 6:
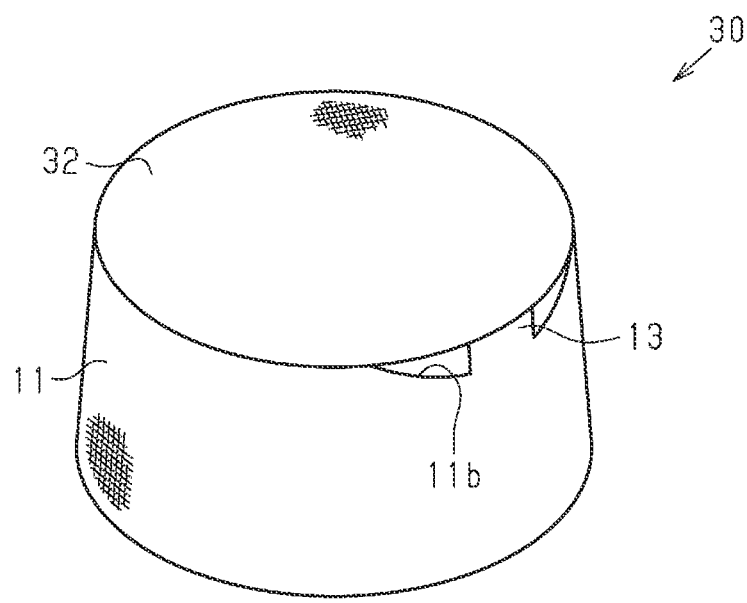
FIG. 6 is a perspective view of the insert-molded mesh shown in FIG. 5 in a state having a tubular shape.

FIG. 6 shows the insert-molded mesh 30 shaped into a tubular form.

As shown in FIG. 6, the side wall 11 is shaped into a tubular form, and a connection section between the connection portion 13 and the bottom wall 32 is bent so that the bottom wall 32 covers one of the openings formed by the side wall 11. In this case, the indentation 11b of the side wall 11 forms gaps at the two opposite sides of the connection portion 13 that connects the side wall 11 and the bottom wall 12. This avoids the formation of creases at the boundary between the side wall 11 and the bottom wall 12.

The insert-molded mesh 30 of the present embodiment is applied to the insert-molded filter 20. In this case, the thickness of the first ring 21A in the direction in which the tubular body formed by the side wall 11 extends is greater than the amount the indentation 11b is indented in the side wall 11. Thus, the gaps formed between the side wall 11 and the bottom wall 12 are covered by the first ring 21A.

As described above, the insert-molded mesh according to the second embodiment has the following advantage in addition to advantages (1), (4), and (5), which are described above.

(6) When the insert-molded mesh 30 is shaped into a tubular form, the indentation 11b of the side wall 11 forms gaps at the opposite sides of the connection portion 13. This avoids the formation of creases at the boundary between the side wall 11 and the bottom wall 12.

The first embodiment and the second embodiment may be modified as follows.

Welded Portion

The two bonding margins 11a may be bonded together by a single welded portion that extends linearly in the width direction DW of the side wall 11. This also securely bonds the two bonding margins 11a.

Connection Portion

The connection portion 13 may connect a bonding margin 11a of the side wall 11 and the bottom wall 12. Such an insert-molded mesh 10 also connects the bottom wall 12 and the side wall 11 with the connection portion 13 and thus has advantage (1), which is described above.

The connection portion 13 may be connected to the straight portion 12E2 at a portion located near one of the ends of the straight portion 12E2. In this case, when the insert-molded mesh 10 is shaped into a tubular form, a gap is formed by the tube end of the side wall 11, the straight portion 12E2, and the connection portion 13. This obtains advantage (3), which is described above.

In the longitudinal direction DL, the width of the connection portion 13 may be equal to the width of the bottom wall 12 where the connection portion 13 is connected. For example, the width of the connection portion 13 may be equal to the width of the straight portion 12E2 in the longitudinal direction DL. Such an insert-molded mesh 10 also connects the bottom wall 12 and the side wall 11 with the connection portion 13. This has advantage (1), which is described above.

Bottom Wall

The bottom wall 12 may be adjacent to a bonding margin 11a of the side wall 11 in the width direction DW. In this case, the insert-molded mesh 10 also connects the bottom wall 12 and the side wall 11 with the connection portion 13. This also has advantage (1), which is described above.

Insert-Molded Mesh

The insert-molded mesh 10 may be cylindrical when shaped into a tubular form. In this case, the side wall 11 may be rectangular and extend in the longitudinal direction DL.

The invention claimed is:

1. An insert-molded mesh formed by a single mesh sheet, the insert-molded mesh comprising:
    a single side wall that is band-shaped and extends in a longitudinal direction, the side wall including two bonding margins at two ends separated in the longitudinal direction by a first side wall edge opposite a second side wall edge, wherein the first side wall edge is continuous;
    a bottom wall located in a width direction from the side wall such that a bottom wall edge of the bottom wall is proximate the second side wall edge; and
    a connection portion that connects the side wall and the bottom wall to form a boundary at the second side wall edge around the bottom wall edge, wherein the insert-molded mesh is configured to be shaped into a tubular form and arranged in a mold.

2. The insert-molded mesh according to claim 1, wherein the connection portion has a width that is less than that of the bottom wall in the longitudinal direction.

3. The insert-molded mesh according to claim 2, wherein
    an edge of the bottom wall includes a major arc portion that connects two points of an imaginary circle and a straight portion that connects the two points, and
    the connection portion is connected to the straight portion.

4. The insert-molded mesh according to claim 1, wherein
    the second side wall edge of the side wall extends in the longitudinal direction and includes an indentation, and
    the connection portion connects the bottom wall and the indentation of the side wall.

5. The insert-molded mesh according to claim 1, wherein the connection portion connects the bottom wall and the side wall at a position separated from the two bonding margins in the longitudinal direction.

6. An insert-molded mesh formed by a single mesh sheet, the insert-molded mesh comprising:
- a side wall having a tubular form that is bonded at a bonding margin;
- welded portions arranged on the bonding margin at intervals in a direction in which a tubular body formed by the side wall extends;
- a bottom wall that covers an area formed by one tube end of the side wall; and
- a single connection portion that connects the side wall and the bottom wall, wherein the connection portion is less than a width of the bottom wall, in a width direction, forming gaps between the side wall and the bottom wall over a range corresponding to a difference between the width of the connection portion and the width of the bottom wall in the width direction.

7. The insert-molded mesh according to claim 1, wherein the bottom wall edge is defined partially by a straight portion, and wherein the connection portion is rectangular and extends from the straight portion to the second side wall edge in the width direction.

8. The insert-molded mesh according to claim 7, wherein the rectangular connection portion has a first side opposite a second side in the width direction, wherein the first side and the second side are parallel.

* * * * *